United States Patent [19]
Köhler et al.

[11] Patent Number: 4,511,917
[45] Date of Patent: Apr. 16, 1985

[54] DETERMINING AGREEMENT BETWEEN AN ANALYSIS SIGNAL AND AT LEAST ONE REFERENCE SIGNAL

[75] Inventors: Hans O. Köhler, Lilla vägen 10, s-142 00 Trångsund, Sweden; Sten K. Strömvall, Farsta, Sweden

[73] Assignee: Hans Olof Kohler, London, England

[21] Appl. No.: 514,808

[22] PCT Filed: Oct. 20, 1982

[86] PCT No.: PCT/SE82/00339
§ 371 Date: Jun. 20, 1983
§ 102(e) Date: Jun. 20, 1983

[87] PCT Pub. No.: WO83/01526
PCT Pub. Date: Apr. 28, 1983

[30] Foreign Application Priority Data
Oct. 20, 1981 [SE] Sweden ............... 8106186

[51] Int. Cl.³ .................. H03K 5/26; H04N 7/02
[52] U.S. Cl. ............................. 358/84; 455/2; 328/110; 324/77 G; 381/56
[58] Field of Search ............ 358/84, 117, 122; 381/42, 43, 56; 328/110; 455/2, 6; 324/77 G

[56] References Cited
U.S. PATENT DOCUMENTS

| | | |
|---|---|---|
| 3,416,080 | 12/1968 | Wright et al. |
| 3,456,201 | 7/1969 | Zrubek |
| 3,531,583 | 9/1970 | Walker ................ 358/84 |
| 3,597,636 | 8/1971 | Kravchenko ........... 328/110 X |
| 3,639,843 | 2/1972 | Schmidhauser |
| 3,735,218 | 5/1973 | Kunert |
| 3,919,479 | 11/1975 | Moon et al. .......... 358/84 X |
| 3,971,994 | 7/1976 | Shepherd |
| 4,028,493 | 6/1977 | Brennemann et al. |
| 4,031,543 | 6/1977 | Holz .................. 358/84 X |
| 4,142,156 | 2/1979 | Freund ................ 358/84 X |
| 4,234,883 | 11/1980 | Kaelin et al. ......... 324/77 G X |

FOREIGN PATENT DOCUMENTS

| | | |
|---|---|---|
| 1197922 | 8/1965 | Fed. Rep. of Germany |
| 2039557 | 2/1972 | Fed. Rep. of Germany |
| 2406485 | 9/1974 | Fed. Rep. of Germany |
| 2620059 | 11/1977 | Fed. Rep. of Germany |
| 1509916 | 12/1967 | France |
| 1093102 | 11/1967 | United Kingdom |

*Primary Examiner*—Keith E. George
*Attorney, Agent, or Firm*—Leydig, Voit, Osann, Mayer and Holt

[57] ABSTRACT

A method and apparatus for determining concordance between an analysis signal with at least one reference signal. The smoothed signals or envelopes are formed of a signal which is to be examined and at least one reference signal. A pulse train is generated for each of the smoothed signals or envelopes, and comprises pulses present during the time for a predetermined polarity of the smoothed signal or envelopes relative a threshold signal. The pulse trains are compared at regular intervals with each other, simultaneous coincidence of pulses in both trains at a predetermined number of consecutive comparisons constituting the criterion that the signals which are to be examined are in concordance with the reference signal. For carrying out this signal examination there are circuits means (2, 4) adapted for forming the smoothed signals or envelopes of the signals. The outputs from said means are connected to one input of a comparator (6) for each signal. A threshold signal ($U_{Ref1}$, $U_{Ref2}$) is applied to the second input of the comparators for generating an output pulse train comprising pulses generated at a predetermined polarity of said smoothed signals or envelopes relative the threshold signals. Circuits (12, 14, 16, 18) are further adapted for comparing the pulse trains and registering simultaneous coincidence of pulses in the two trains for a predetermined number of consecutive comparisons as the criterion that the examined signal and a given reference signal are in concordance. The invention is primarily intended for utilizing in automatic debiting of utilized video service in a hotel or the like. The invention may also be used for monitoring processes or machines which have specific sound spectra for faults.

10 Claims, 2 Drawing Figures

$fg_1 = 0.5 Hz$
$fg_2 = 10 Hz$

DETERMINING AGREEMENT BETWEEN AN ANALYSIS SIGNAL AND AT LEAST ONE REFERENCE SIGNAL

TECHNICAL FIELD

The present invention relates to a method and apparatus for determining the agreement between an analysis signal and at least one reference signal.

BACKGROUND ART

The object of the present invention is to propose a method and provide an apparatus for monitoring, where a characteristic signal from the apparatus, process or the like which is to be monitored is utilized for analysis.

The invention is particularly suitable for use in monitoring apparatus and processes having specific sound spectra, so that audio signals can be utilized for analysis.

It is thus possible to determine with the aid of the invention whether a given signal agrees with one or more given signals, and in the latter case which one of the signals it agrees with.

DISCLOSURE OF THE INVENTION

The analysis takes place such that the signals are smoothed and pulse trains corresponding to said smoothed signals or envelopes are generated, a predetermined number of consecutive agreements in the pulse train being required for the signals to be considered in agreement. This is a safety measure so that the signals will not be registered as being in agreement with randomly coinciding pulses in the corresponding pulse trains.

The method in accordance with the invention can be utilized for comparing a signal with an optional number of given signals, the apparatus in accordance with the invention being built up with a corresponding number of parallel branches for analysis of the signals and comparison of the analysis signal with each of the given signals.

A preferred embodiment of the apparatus in accordance with the invention, selected here as an example, will be described in the following in conjunction with the appended drawings in which

BEST MODE FOR CARRYING OUT THE INVENTION

Figure 1:
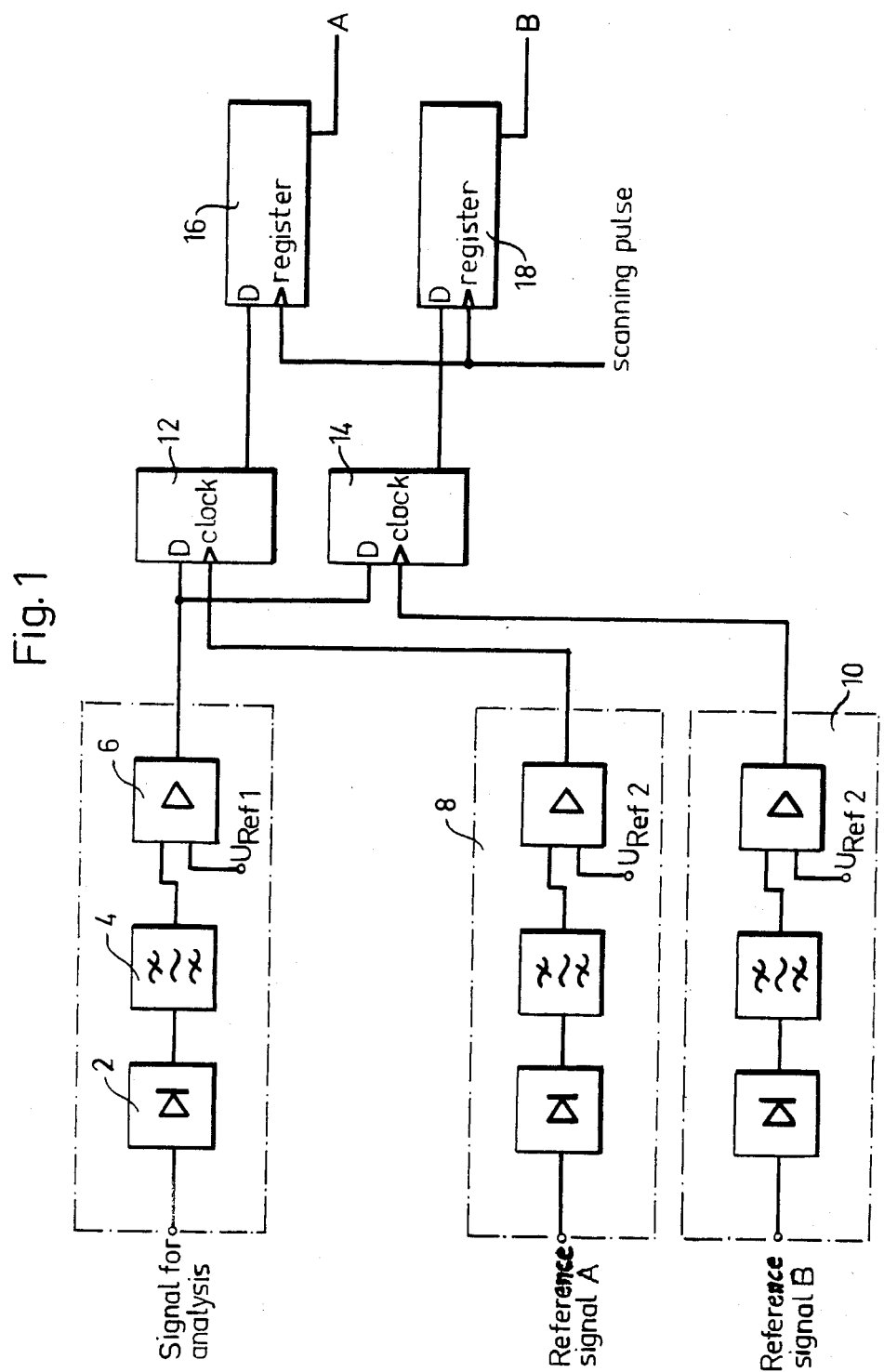
FIG. 1 is a block diagram of the principal construction of the apparatus in accordance with the invention in an embodiment for two reference signals.

To build the smoothed signal or the envelope of the signal which is to be examined it is fed to a rectifier 2 and the rectified output signal is filtered in a bandpass filter 4, the passband of which is between 0.5 and 10 Hz, see FIG. 1. It has been found advantageous for the subsequent signal analysis to work within this low-frequency range, inter alia from the noise elimination aspect. The signal DC voltage level is also cut away in the filter 4.

The rectifier 2 comprises two operational amplifiers, diodes and resistances, and the filter 4 is an active filter with an operational amplifier.

The signal envelope or smoothed signal obtained from the filter output is applied to one input of a comparator 6. A threshold signal $U_{Ref\,1}$ is applied to the other input of the comparator 6 to prevent undesired changes of the state of the comparator due to noise. An output pulse is obtained from the comparator when the input signal exceeds the applied threshold signal and the pulse length is determined by the duration of this state.

The comparator 6 is an operational amplifier. For each of the reference signals A and B in FIG. 1 there is a like circuit 8 and 10, respectively, comprising rectifier, bandpass filter and comparator.

The threshold signal $U_{Ref2}$ to the comparators in the reference signal circuits 8, 10 is somewhat higher than the threshold signal $U_{Ref1}$. The output pulses from the comparators in the reference signal circuits 8 and 10 will thus be somewhat narrower than the output pulses from the comparator 6, and the reference signal pulses will be contained within the pulses from the comparator 6.

The output pulse train from the comparator 6 is applied to the data input of two D flip-flops 12, 14. The output pulse train from the reference signal circuits 8 and 10 are applied as clock signals to the flip-flops 12 and 14, respectively. The flip-flops 12, 14 go to a one state (send an output pulse) for concordant signals. The flip-flops thus have an AND gate function. The flip-flops gate on the flanks from the pulses from the comparators, and by $U_{Ref2}$ being greater than $U_{Ref1}$ the output pulses from the reference signal circuits are, in time, contained within the pulses from the comparator 6, i.e. the signal from the comparator 6 is at the flip-flops 12, 14, when there is applied to these the output pulses from the reference signal circuits 8, 10, the latter pulses also having the character of gate pulses.

Figure 2:
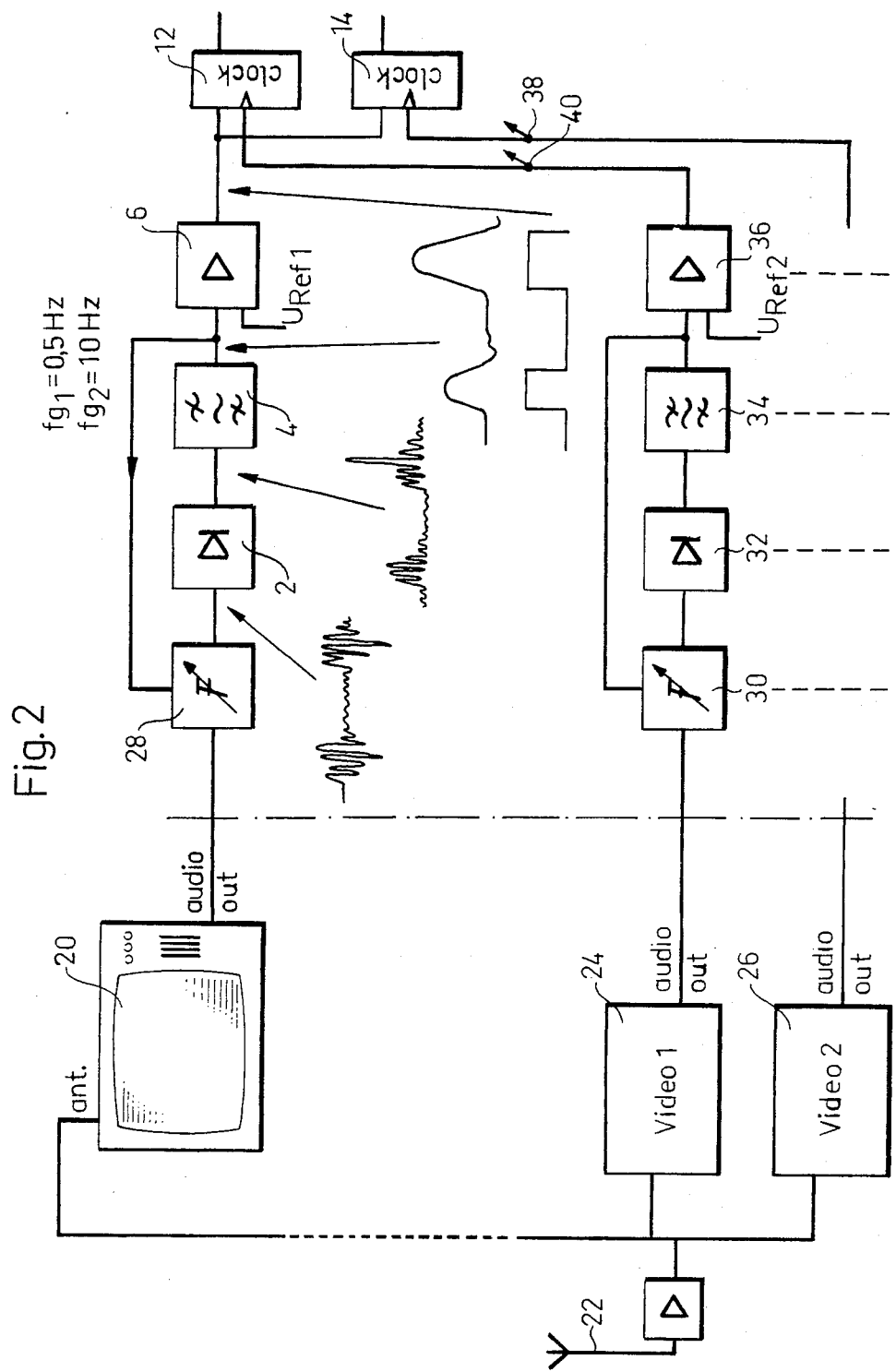
FIG. 2 is an example of the use of the apparatus in accordance with the invention for automatic debiting of utilized video service.

The output signals from flip-flops 12 and 14, which thus give information as to the agreement between the pulse trains representing the signal to be examined and the reference signals, are applied to the data input of shift registers 16 and 18, respectively. The registers 16, 18 are scanned at regular intervals by applying a scanning pulse, and at a predetermined number of consecutive, positive answers regarding the concordance of the compared pulse trains said registers 16, 18 trigger a following counter (not shown in FIG. 1). The apparatus of FIG. 1 is shown in FIG. 2 in use for automatic debiting of utilized video service in a hotel or the like, where the ordinary television programs or one or more available video programs can be connected to the television receivers in the rooms. In such a case the video program utilization shall be debited, but not that of the ordinary TV programs. This is enabled with the present invention in a simple manner without any extra equipment on the television receiver.

The principle forming the basis of the invention here is that speech and music consist of more or less distinct sound packages, e.g. accentuated syllables, individual words, accentuated portions of a beat in music etc., the smoothed signals or envelopes of these sound packages being compared with the smoothed signal or envelope of the reference sound package.

The same units in FIGS. 1 and 2 have been given the same reference denotations.

A television receiver 20 is connected to an antenna 22 for receiving ordinary television programs, and to two video tape players 24, 26 for receiving programs from them.

An audio signal is taken from the television receiver 20 and fed to a regulating amplifier 28.

The audio signal is suitably taken out before the television receiver volume control via a buffer amplifier to separate the reciever high voltage from the signal taken out.

The signal level is adjusted by means of the regulating amplifier 28 so that a suitable level is applied to the input of the comparator 6. A feedback loop is arranged for this purpose from the comparator input to the amplifier 28. After the amplifier 28 there is the circuit described in connection with FIG. 1, comprising the rectifier 2, bandpass filter 4 and comparator 6.

The appearance of the signals after the regulating amplifier 28, after rectifying and after filtering, as well as the output pulse train from the comparator 6 are illustrated in the Figure.

An audio signal is similarly taken out from the video tape players 24, 26. This is obtained by the intermediate-frequency signal being transposed down to the audio range.

The audio signals from the video tape players 24, 26 are treated in the same way as the audio signal from the television receiver 20 in like circuits 30, 32, 34, 36.

As mentioned in conjunction with FIG. 1, the threshold signal $U_{Ref2}$ applied to the comparator 36 is higher than the threshold signal $U_{Ref1}$ which is applied to the comparator 6.

As was mentioned in conjunction with FIG. 1, the output signal from the comparator 6 is applied to the flip-flops 12 and 14, and the output signals from the comparators 36 are applied as clock signals to each of the flip-flops 12 and 14.

The video tape players 24, 26 can naturally be connected to several different television sets, and for that reason there is schematically indicated outputs at 38 and 40 for taking the output signals from the comparators 36 to other flip-flops, which are also supplied with the processed audio signal from other television receivers.

After the flip-flops 12 and 14 there are the register and counter as mentioned in conjunction with FIG. 1. In order to ensure that randomly coinciding sound packages do not achieve incorrect registration of concordance, there is required in the apparatus in accordance with the invention a plurality of consecutive, positive answers for agreement between analysis and reference signals to be considered present.

As mentioned above, the registers are scanned at regular intervals. For an automatic system for debiting of the kind mentioned above, the scanning interval for the shift registers can be of the order of magnitude of one minute, and the number of consecutive positive answers for triggering the following counter can be 6 or 7. The shift registers will thus act as a unit for generating a time lag of 6 or 7 minutes before the counter is triggered.

The shift registers 16, 18 are further arranged so that the whole register is zeroed after two consecutive, negative answers regarding the concordance of the compared pulse trains.

The counter can be one of the type used in ordinary telephone conversation counting, and it is triggered at regular intervals, e.g. in the range of 0.1-100 seconds.

In the example described above there is illustrated an embodiment in which two different video tape players (two reference signals) with different programs can be connected to a television receiver, which can also receive the ordinary broadcast television programs. The apparatus can of course in principle be extended for any number of video tape players (reference signals) and for an optional number of television receivers.

The invention may also be utilized in other fields than the ones given above. The invention is utilizable in applications where it is desired to determine concordance between different signals e.g. for measuring the duration of a signal or for the purpose of monitoring. As is indicated in the introduction, the invention may also be utilized for monitoring processes and machines. For example, a machine bearing may be monitored by having the characteristic sound signal stored for comparison with the current sound signal which is measured during operation of the machine. In this application concordance between the signals is the normal condition, while difference in the signals denotes an abnormal function. The apparatus described in conjunction with FIGS. 1 and 2 must therefore be modified, e.g. so that an alarm is triggered for different signals. This is a trivial measure for one skilled in the art.

We claim:

1. A method of determining concordance of an analysis signal with at least one reference signal comprising forming smoothed envelopes of the analysis signal and the reference signal, generating a pulse train for each of the smoothed envelopes comprising pulses which have a duration determined by the time of a predetermined relationship of the envelopes, above or below a threshold signal, said pulse trains respectively representing the analysis signal and the reference signal, and subsequently registering the simultaneous occurence of pulses in the two trains in a predetermined number of consecutive comparisons made each time a pulse occurs in the reference signal pulse train constituting the criterion for the analysis signal and the reference signal being in concordance.

2. The method as claimed in claim 1 wherein the smoothed envelopes are formed by rectifying and bandpass filtering.

3. Method as claimed in claim 1 or 2 wherein the signals are audio signals.

4. Apparatus for determining the concordance of an analysis signal with at least one reference signal comprising means for forming smoothed envelopes of the analysis signal and the reference signal, a comparator having a first input connected to receive the envelope output from each said forming means, each comparator having a second input connected to receive a threshold signal and being operable to generate an output pulse train consisting of pulses which have a duration determined by the time of a predeterined relationship above or below said threshold signal, said pulse train representing said analysis signal and said reference signal, and means for registering simultaneous occurrence of pulses in both pulse trains in a predetermined number of consecutive comparisons made each time a pulse occurs in the reference signal pulse train as the criterion for concordance between the analysis and reference signals.

5. Apparatus as claimed in claim 4 wherein the means for forming the envelopes include, for each signal, a rectifier followed by a bandpass filter.

6. Apparatus as claimed in claim 4 or 5 wherein the threshold signal for the reference signal comparator is higher than the threshold signal for the analysis signal comparator, the comparators thus sending output pulses when said envelopes exceed the threshold signals.

7. Apparatus as claimed in claim 4 wherein said registering means includes a flip-flop having inputs to which the pulse trains representing the analysis signal and the reference signal are applied, a register connected to receive an output signal from said flip-flop upon simultaneous occurrence of pulses in the applied pulse trains, a counter triggered by said register for registering the analysis and reference signals as being in concordance after the register has received said output signal from the flip-flop for a predetermined number of consecutive comparisons.

8. Apparatus as claimed in claim 5 wherein the analysis and reference signals are audio signals and the passband of the bandpass filter is between 0.5 and 10 Herz.

9. Apparatus as claimed in claim 4 wherein the analysis signal is compared with a plurality of reference signals, and circuit means are provided in parallel for each reference signal including in each parallel branch means for forming a smoothed envelope and a comparator.

10. Apparatus as claimed in claim 9 wherein the analysis signal is an audio signal from a television receiver and the reference signals are audio signals from a video tape player connectable to the television receiver for registering the time during which the player is in circuit with the receiver.

* * * * *